United States Patent [19]

Khandkar et al.

[11] Patent Number: 5,614,127
[45] Date of Patent: Mar. 25, 1997

[54] HIGH-PERFORMANCE CERAMIC INTERCONNECT FOR SOFC APPLICATIONS

[75] Inventors: Ashok C. Khandkar; Christopher E. Milliken, both of Salt Lake City; S. Elangovan, Sandy, all of Utah

[73] Assignee: Gas Research Institute, Chicago, Ill.

[21] Appl. No.: 396,077

[22] Filed: Feb. 28, 1995

Related U.S. Application Data

[63] Continuation of Ser. No. 80,924, Jun. 21, 1993, abandoned.

[51] Int. Cl.$^6$ .................................. A01B 1/06; A01B 1/08
[52] U.S. Cl. ........................... 252/519; 252/521; 423/593; 429/30; 429/33; 429/193; 501/123; 501/152
[58] Field of Search .................... 252/500, 518, 252/519, 521; 423/593; 429/30, 33, 193; 501/123, 152

[56] References Cited

U.S. PATENT DOCUMENTS

| | | | |
|---|---|---|---|
| 3,974,108 | 8/1976 | Staut | 252/521 |
| 4,035,266 | 7/1977 | Alexandrov | 252/521 |
| 4,045,375 | 8/1977 | Komatu | 252/521 |
| 4,133,778 | 1/1979 | Gray | 252/521 |
| 4,305,848 | 12/1981 | Hikita | 252/521 |
| 4,476,196 | 10/1984 | Poeppel et al. | 429/32 |
| 4,476,198 | 10/1984 | Ackerman et al. | 429/32 |
| 4,562,124 | 12/1985 | Ruka | 252/521 |
| 4,816,036 | 3/1989 | Kotchick | 429/30 |
| 4,830,780 | 5/1989 | Olson | 252/521 |
| 5,009,763 | 4/1991 | Hise | 429/13 |
| 5,387,476 | 2/1995 | Koch et al. | 252/521 |

FOREIGN PATENT DOCUMENTS

| | | |
|---|---|---|
| 4065354 | 3/1992 | Japan . |
| 4108667 | 4/1992 | Japan . |
| 4135639 | 5/1992 | Japan . |
| 5000844 | 1/1993 | Japan . |

OTHER PUBLICATIONS

JAPIO Abstract; JP 5000844 A Jan. 8, 1993.
JAPIO Abstract; JP 4065354 A Mar. 2, 1992.
JAPIO Abstract; JP 4108667 A Apr. 9, 1992.
D. Meadowcroft, "Some Properties of strontium–doped lanthanum chromite", Brit J. Appl. Phys., Ser. 2, vol. 2, pp. 1225–1233 (1969).
Chick et al., "Air–sintering Mechanisms of Chromites", Second International Symposium on Solid Oxide Fuel Cells, pp. 621–628 (1991).

*Primary Examiner*—Paul Lieberman
*Assistant Examiner*—M. Kopec
*Attorney, Agent, or Firm*—Dick and Harris

[57] ABSTRACT

An improved ceramic interconnect component for a solid oxide fuel cell having good electrical conductivity thermodynamic stability in the presence of fuel and a coefficient of thermal expansion matching closely that of zirconia electrolytes is disclosed. The interconnect is a lanthanum strontium chromate material containing minor quantities of calcia, and iron and, optionally, very minor quantities of cobalt, as dopants.

5 Claims, 2 Drawing Sheets

HIGH-PERFORMANCE CERAMIC INTERCONNECT FOR SOFC APPLICATIONS

This application is a continuation of application Ser. No. 08/080,924, filed Jun. 21, 1993, now abandoned.

BACKGROUND OF THE INVENTION

1. Field:

The instant invention relates to solid oxide fuel cells and particularly to ceramic interconnect materials having good electrical properties.

2. State of the Art:

Solid oxide fuel cells (SOFC's) are structured to convert the energy of combustion directly to electrical energy. Low molecular weight, residue-free gases, especially natural gas, carbon monoxide, hydrogen and other clean-burning gases, are employed as fuels. A solid electrolyte, e.g. $ZrO_2$, which rapidly transports oxygen ions is an essential component in SOFC's.

Typical SOFC's are illustrated in the following U.S. patents:

U.S. Pat. No. 4,476,198 Ackerman, et al.
U.S. Pat. No. 4,816,036 Kotchick
U.S. Pat. No. 4,476,196 Poeppel, et al.

The fuel cell operation is shown schematically in FIG. A, wherein oxygen is introduced at the cathode, dissociates to form oxygen ions by picking up electrons from the external circuit. The oxygen ions flow through the electrolyte (which is at an elevated temperature ~700° C. or more) to combine with hydrogen, for example, in a combustion reaction (exothermic). The electrochemical heat of reaction and the internal resistance maintains the fuel cell at an efficient operating temperature, i.e., one at which the ceramic electrolyte, typically $ZrO_2$, is an efficient transporter of oxygen ions. The combustion reaction (half cell reaction at the anode) is as follows:

$$O^= + H_2 \rightarrow H_2O + 2e^-$$

The electrons freed by this reaction are available as electrical energy to perform useful work. The circuit must be complete so that the electrons are available at the cathode-electrolyte interface to participate in the dissociation of oxygen molecules into oxygen ions, to wit:

$$O_2 + 4e^- \rightarrow 2O^=$$

Ceramic interconnect devices interconnect one cell to another electrically and act as channels for both the gaseous fuel and oxygen, as illustrated in FIG. B. While FIG. B shows only two cells connected by a single interconnect, it is typical that a plurality of interconnects are used to form a "stack" of cells, thus serially connecting one cell to another from an electrical standpoint.

The interconnect must be a good conductor of electricity, have a coefficient of thermal expansion (CTE) which closely matches the electrolyte, e.g. zirconia, and be thermodynamically stable simultaneously at high oxygen partial pressures in oxygen or air and low oxygen partial pressures in the fuel gas at cell operating temperatures. Many materials may satisfy one or two of these requirements, but the lack of effective, long lasting interconnects has thus far retarded the development of a commercially usable fuel cell, such as those made of lanthanum strontium chromite (LSC).

SUMMARY OF THE INVENTION

An effective, durable interconnect for SOFC's has been invented. The interconnect is a lanthanum strontium calcium chromite, identified herein as LS2C, which preferably contains minor quantities of cobalt and/or iron. The ceramic composition has the following formula:

$$La_{0.99-(w+x)} Sr_w Ca_x Cr_{1-(y+z)} Co_y Fe_z O_3$$

wherein
W (Sr)=0.08 to 0.14
X (Ca)=0.02 to 0.08
Y (Co)=0.00 to 0.05
Z (Fe)=0.00 to 0.05
when W=0.08, X=0.02 and Y and Z=0, then the formula is $$La_{0.89} Sr_{0.08} Ca_{0.02} Cr_{1.0} O_3$$

which is the interconnect material in its simplest compositional form.

The properties of the composition are generally improved for purposes as an interconnect by including a minor amount of cobalt and/or iron with cobalt being a preferred dopant. The composition of this invention provides an interconnect with excellent electrical conductivity in the presence of a fuel gas and a coefficient of thermal expansion which closely matches zirconia, the currently preferred electrolyte material.

DETAILED DESCRIPTION OF THE PREFERRED EMBODIMENT

Figure 1:
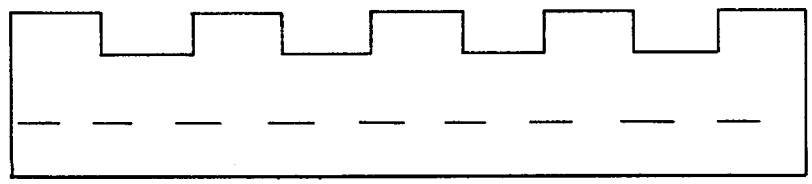
FIG. 1 is an elevational view of an interconnect device.
Figure 2:
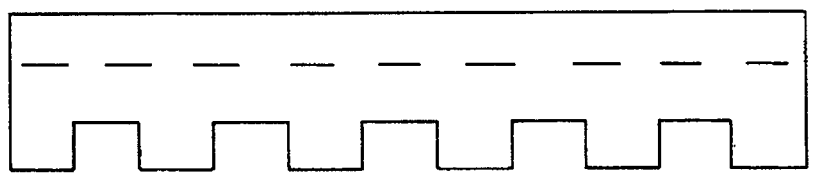
FIG. 2 is an elevational view of the interconnect of FIG. 1 rotated 90° about a vertical axis.
Figure 3:
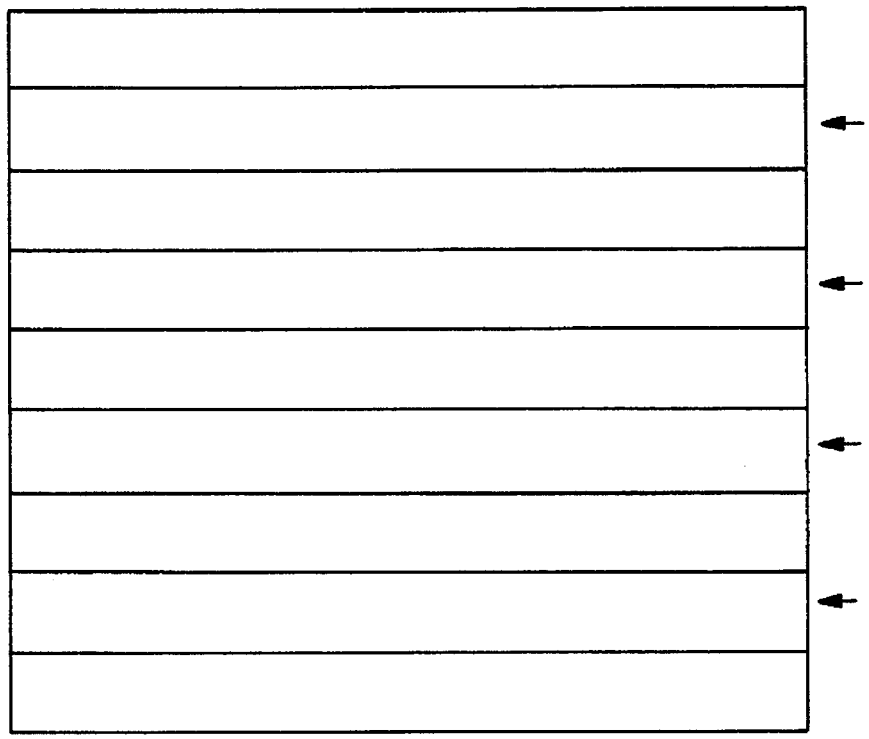
FIG. 3 is a plan view of the interconnect of FIG. 1.
Figure 4:
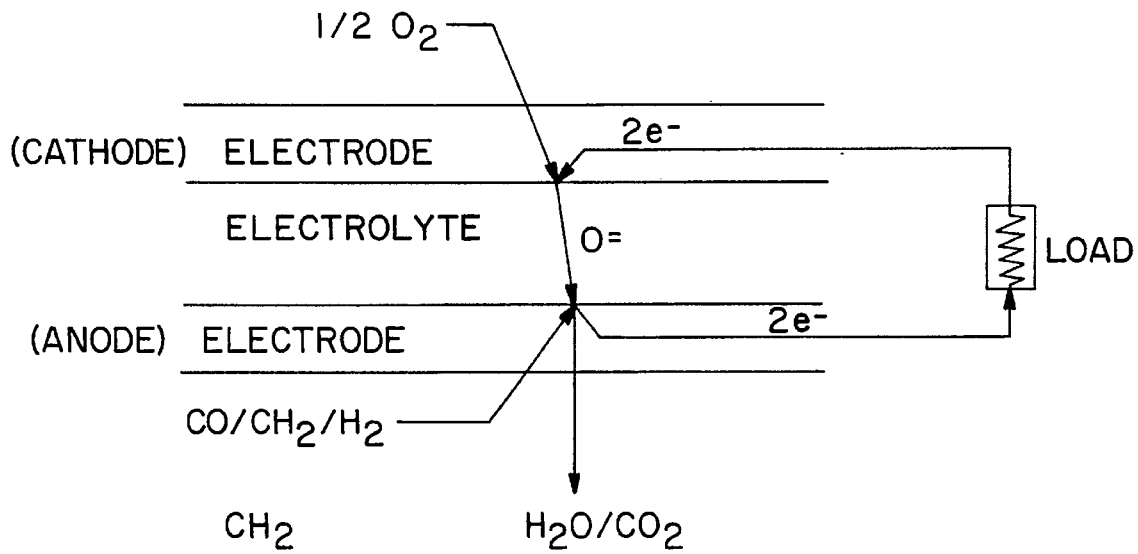
FIG. 4 is a schematic of a fuel cell.
Figure 5:
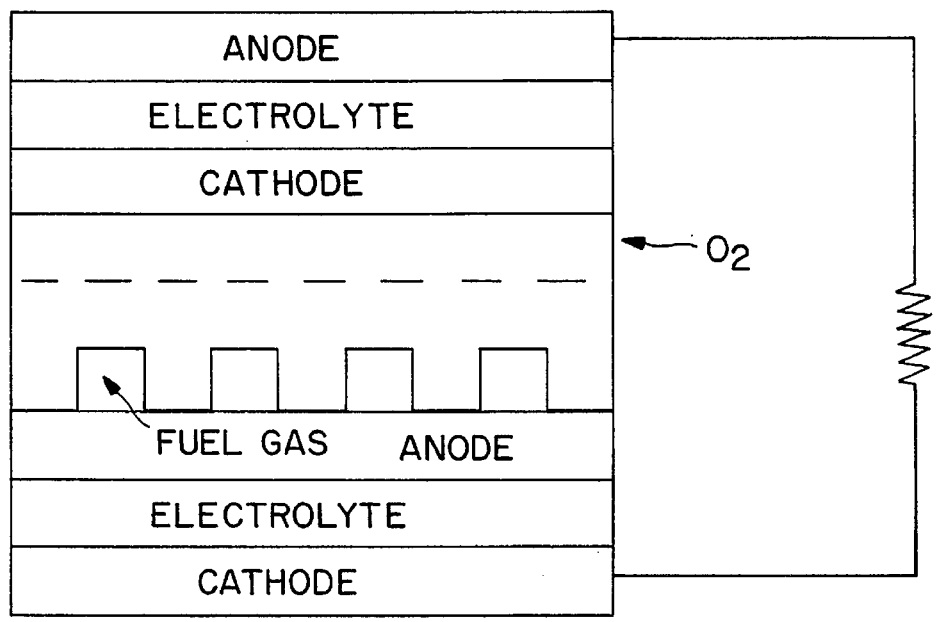
FIG. 5 is a schematic of a two-cell fuel cell with an interconnect.

An improved ceramic interconnect has been invented. The interconnect is composed of a ceramic material which meets the exacting criteria as set forth in the following table:

TABLE 1

| Criterion | Requirement | Failure Mode |
|---|---|---|
| Gas Impermeability | >~95% Density | Direct Combustion Lower Performance Local Hot Spots |
| Structural Integrity | No Mechanical or Microstructural Degradation | Cracked Electrolytes Low Stack Performance |
| Electrical Conductivity | >2Ω$^{-1}$cm$^{-1}$ | Low Stack Performance |
| Compatible Thermal | 10.5 ± 0.5 × 10$^-$ | Inadequate |

TABLE 1-continued

| Criterion | Requirement | Failure Mode |
|---|---|---|
| Expansion (~$ZrO_2$) | $6/°C$ | Bonding Cracked Electrolytes |
| Thermodynamic Stability | Minimal Change in Conductivity over 50,000 hrs | Decreased Performance Eventual Stack Failure |

The lanthanum strontium calcium chromite (LS2C) composition of the instant invention meets the criteria set forth in the above table.

While various lanthanum strontium chromite materials have been used for various purposes, the lanthanum strontium calcium chromite compositions as set forth herein have exceptional properties as an interconnect for SOFC's.

The properties of various chromite materials such as LSC and YSC compositions are set forth in Table 2:

TABLE 2

PROPERTIES FOR SELECTED INTERCONNECT MATERIALS

| Composition (Acronym) | Sintering Temp. | Density (% TD) | CTE $10^-$ $6/°C$ | Air Cond. (1/ $\Omega cm$) | Fuel Cond. (1/ $\Omega cm$) | Sintering Yield (%) |
|---|---|---|---|---|---|---|
| Minimum requirement | <1700° C. | 94 | ~10.5 | >10 | >2 | >80 |
| $La_{.83}Sr_{.16}Cr_{.98}Fe_{.02}O_3$ (LSFeC) | 1680° C. | 94 | 9.8–11.0 | 1.5–3 | 0.3 | 90 |
| $La_{xs}Sr_{.16}Cr_{.98}Fe_{.02}O_3$ xs = 0.85 – 0.87 ($L_{xs}FeC$) | 1680° C. | 96 | 9.6 | 2.5–4 | 0.3 | 90 |
| $La_{.83}Ca_{.16}Cr_{.90}Co_{.10}O_3$ (L3C) | 1500° C. | 98 | 10–12.8 | 23–30 | 1.7 | 70 |
| $Y_{.83}Ca_{.16}Cr_{.84}Co_{.16}O_3$ (Y3C) | 1450° C. | 98 | 10–11.7 | 23–30 | 1.7 | 60 |
| $La_{.83}Sr_{.13}Ca_{.03}CrO_3$ (LS2C) | 1650° C. | 94 | 9.6–10.6 | 13–23 | 3–6 | 90 |

The composition identified as LS2C (lanthanum strontium calcium chromite) has the best properties of the various compositions tested.

The LS2C composition has excellent gas impermeability, which is critical so that there is no "leaking" of fuel gas in molecular form through the electrolyte, especially to the oxygen side since combustion at the cathode side not only decreases electrical efficiency (reduced oxygen ion migration) but it also tends to destroy the cathode materials. The LS2C compositions can be pressureless sintered in air to a density of >94% of theoretical.

Not only does the coefficient of thermal expansion (CTE) of LS2C match closely that of zirconia, it has a very uniform CTE over a wide temperature range.

While the electrical conductivity of LS2C in air is not particularly advantageous when compared to compositions L3C and Y3C, and had the material been tested in air only it might have been discarded as an interconnect candidate, the conductivity and stability thereof in fuel is especially good, often an order of magnitude better than any of the other LSC materials tested in fuel. Such good conductivity in fuel was not predictable, especially since its conductivity in air was poorer than either L3C or Y3C. Since there is air on one side of the interconnect and gas on the other side, it is necessary that an interconnect material have good conductivity in both air and gas.

LS2C was the only material tested which met minimum conductivity criteria for both air and fuel.

The unique interconnect compositions of the instant invention may be formed in various ways, as set forth in Table 3.

TABLE 3

POWDER SYNTHESIS TECHNIQUES

| Technique | Advantages | Disadvantages |
|---|---|---|
| Gel Process | Establish Technology Moderately Scaleable Provides Active Powder | Expensive Precursors $NO_x$ Evolution/Pollution |
| Solid State | Industrial Scale Production Inexpensive Raw Mtrls/Processing | Poor Phase Homogeneity Low Activity Powder |
| Co-precipitation | Provides Active Powder High Production Capacity Good Stoichiometric Control | Large Volume Reduction During Calcining |
| Glycine-Nitrate | Highly Reactive Powder Good Homogeneity | Very Low Production Expensive Precursors |

For the purposes of the instant invention, a gel process method of the type generally employed in the preparation of ceramic powders, which provides a homogeneous reactive powder, has generally been preferred, although any other process involving liquid precursors which insure chemical homogeneity on the molecular level are desirable as a method of powder preparation. The initial powder, as contained from the gel process, however, is frequently unacceptable for part fabrication and must be optimized by proper calcining and milling procedures.

Extending calcining at high temperature allows for particle coarsening and eliminates the ultra-fine <0.1 μm particulates that are a result of the gel process. The powder is then reactivated by ball milling and optimally has a final particle size of 0.9 to 0.7 μm and a surface area of 6.0 to 6.5 m²/g. This combination of size and surface area creates a highly active powder than can be easily consolidated by uniaxial pressures of 5 to 15 ksi with a green density in excess of 55% TD. Sintering these parts at 1600° to 1680° C. for 2 hours leads to a final density of >95%.

Interconnects have been fabricated by the following methods as set forth in Table 4:

TABLE 4

| Fabrication Approaches for Interconnect Materials | | | |
|---|---|---|---|
| Approach | Examples | Key Fabrication Technology | Results |
| Sintering Aids | LSC + MgF$_2$<br>LSC + CoCl$_3$<br>LSC + CaCrO$_4$ | Uniform Mixing Sinter at 1500° C. | 94% TD Precipitation of Liquid Phase at Grain Boundary |
| Eutectic Liquid Phase | La(Ca,Co)CrO$_3$<br>Y(Ca,Co)CrO$_3$ | Minimal Calcining Reduced Milling Sinter at 1450° C. | 97% TD Reactive with Setter Materials Warpage |
| Hot Pressing | Any LaCrO$_3$ | Minimal Powder Preparation Sinter at 1450° C. | Very Low Yield Extensive Side Reactions |
| Calcining and Milling | LSC<br>LSFeC<br>LS2C<br>L$_{xs}$FeC | Moderate Calcining Vigorous Milling Sinter at 1650° C. | 95% TD Easy Handling Flat High Yields |

While sintering aids promote liquid phases in the sintering process, these may result in adverse conditions at the grain boundaries or in adverse high temperature instability.

Thus, preferred powders useful in forming invention interconnects of LS2C are preferably made by a gel process, following by calcining and milling as described herein. Such powders preferably have a particle size of about 0.6 to 1.0 μm, essentially no fine particles, i.e. <0.1 μm and preferably a surface area of about 5.5 to 7.0 m²/g. Also, such powder preferably has no low melting ingredients.

Although it is preferred to make the LS2C powders via a gel process and proper calcining and milling, other techniques may be utilized as long as the powder is active, i.e. having the particle size and surface area described above.

Interconnects formed via the powder and processing techniques described herein can be formed in various shapes by uniaxial pressing and conventional sintering. It is advantageous that densities >~95% TD can be obtained without hot pressing, which tends to limit the types of shapes formed.

What is claimed is:

1. An electroconductive conducting interconnect composition having a thermal coefficient of expansion substantially equivalent to zirconia comprising:

an air sintered doped chromite ceramic composition having the formula:

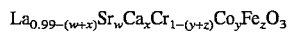

$$La_{0.99-(w+x)}Sr_wCa_xCr_{1-(y+z)}Co_yFe_zO_3$$

wherein

W is from about 0.08 to about 0.14, X is from about 0.02 to about 0.08, Y is from about 0.00 to about 0.05, and Z is from about 0.02 to about 0.05.

2. A solid oxide fuel cell interconnect material comprising:

an air sintered doped chromite ceramic composition having the formula:

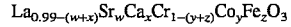

$$La_{0.99-(w+x)}Sr_wCa_xCr_{1-(y+z)}Co_yFe_zO_3$$

wherein

W is from about 0.08 to about 0.14, X is from about 0.02 to about 0.08, Y is from about 0.00 to about 0.05, Z is from about 0.02 to about 0.05 and wherein the coefficient of thermal expansion is from about 9.6° to about 10.6/°C.

3. The solid oxide fuel cell interconnect material of claim 2 wherein said air sintered doped chromite ceramic composition has a conductivity of about 5 Siemens per centimeter to about 30 Siemens per centimeter at a temperature of about 1000° C.

4. The electroconductive conducting interconnect composition of claim 1 wherein Y is zero.

5. The electroconductive conducting interconnect composition of claim 1 wherein W is from about 0.1 to about 0.13 and X is from about 0.03 to about 0.07.

* * * * *